United States Patent [19]

Butlin et al.

[11] Patent Number: 5,104,605
[45] Date of Patent: Apr. 14, 1992

[54] PROCESS FOR INSERT MOLDING DISPOSABLE RAZOR

[75] Inventors: C. Edward Butlin, Erie, Pa.; William T. Conrad, Jr., Shelton, Conn.

[73] Assignee: Warner-Lambert Company, Morris Plains, N.J.

[21] Appl. No.: 236,969

[22] Filed: Aug. 26, 1988

Related U.S. Application Data

[63] Continuation-in-part of Ser. No. 88,368, Aug. 21, 1987, which is a continuation-in-part of Ser. No. 42,493, Apr. 24, 1987.

[51] Int. Cl.$^5$ ............................................. B29C 43/18
[52] U.S. Cl. .................................................. 264/275
[58] Field of Search ..................... 264/275, 278; 30/50, 30/346.60, 348

[56] References Cited

U.S. PATENT DOCUMENTS

| | | | |
|---|---|---|---|
| 2,789,346 | 4/1957 | Algier et al. | 264/275 |
| 3,209,409 | 10/1965 | Grathwohl | 264/275 |
| 4,651,735 | 3/1987 | Berger | 30/49 |

Primary Examiner—Leo B. Tentoni
Attorney, Agent, or Firm—Richard S. Bullitt

[57] ABSTRACT

According to this invention, a disposable razor or razor cartridge is formed by molding, as a single unit, a blade covering means and blade support means by supporting the blade by a trident-shaped supporting member butting the blade with the tips of the support member to coincide with an opening formed during molding on either side of the blade support means and a centrally positioned sleeve having an opening adjacent to the blade.

4 Claims, 4 Drawing Sheets

PROCESS FOR INSERT MOLDING DISPOSABLE RAZOR

CROSS REFERENCE TO RELATED APPLICATION

This application is a continuation in part of U.S. application Ser. No. 088,368 filed Aug. 21, 1987 which is, in turn a continuation in part of patent application Ser. No. 042,493 filed Apr. 24, 1987.

FIELD OF THE INVENTION

This invention relates to a process for manufacturing a disposable razor or cartridge and particularly a disposable razor in which the blade support and cover are unitarily formed and insert molded around the blade.

BACKGROUND OF THE INVENTION

Currently, disposable razors provide a substantial portion of the market for wet shaving.

With the exception of the blade or blades (and possibly a spacer) the disposable razors are made out of thermoplastic material. The cap and blade support or seat components, depending upon the ultimate design, are molded separately and then assembled. For example the "MicroTrac" disposable razor manufactured by Gillette holds a single unit blade seat, back and cap with the cap including outwardly extending fingers. The blade subassembly consisting of two blades and a spacer is inserted between the molded cap and seat with the finger-like projections extending from the top of the cap serving as leaf springs to retain the blade subassembly. This combination is then mated to a handle by press fitting into the tab-finger combination. It is apparent that this process involves not only separate steps, but separate work stations requiring individual sub assembly and ultimate assembly.

Other assembly processes for disposable razors utilize staking from projections depending either from the cap or the seat, which mate with reciprocal openings in the other part and position the blades and/or spacer. The handle is usually made separately from the seat portion. Again, separate assembly steps at separate locations are required to produce the disposable razor.

Ultimately, a disposable razor which could be assembled with a single work station having all the plastic parts produced in a single cavity would be desirable because the steps of subassembly, final assembly and the conveying of the various components from location to location around the manufacturing area could be eliminated. Prior art patents have disclosed various attempts to accomplish this.

U.S. patent application Ser. No. 615,603 filed in the name of Ernest F. Kiraly et al on May 31, 1984 describes a razor with a blade having a slot therein. According to the application, the blade is permanently secured in the head portion of the razor and the handle and guard portion are molded integrally with the head.

British Patent 1,565,296 cited during the prosecution of the above-referred to application discloses making a unitary handle guard member and blade support and then attaching a z-shaped blade by upset rivets, or the like to the support.

U.S. Pat. No. 4,489,627 issued Dec. 27, 1984 to Lembke describes a razor manufacturing process in which a double edged strip of blade metal is parted along a center line and cropped to form two strips, each containing a series of spaced apart blades connected by webs to an elongate backing strip. Each strip, which now consists of a plurality of blades and a backing strip, is fed into a molding machine in which, either the shaving unit or blade-containing-component of a razor, is molded directly around each individual blade. The web is then parted to release the molded razor, etc. from the backing strip. It is unclear, according to Lembke, how the remaining razor components are manufactured. It is apparent, however, that the molding machine completely surrounds the blade segment during molding. Lembke, therefore, requires the handling of an elongated metal strip, its control and insertion in either a multi-cavity mold or a very large single cavity mold and either a series of razors or heads joined together in a single unit which must be subsequently disassembled. Conveying of a metal web of the type described in extremely difficult when it is necessary to protect a delicate cutting edge and even more so when two cutting edges must be protected.

U.S. Pat. No. 3,209,409 to K. L. Grathwohl describes injection molded razors made in packs wherein pins having a relatively small cross sectional diameter clamp the blade on its top and bottom face. Unfortunately there is insufficient support from these pins to prevent blade distortion as the hot fluid plastic rushes around the blade during the molding process. Also, shaving debris would collect in the resultant cap and seat holes which is, at the very least aesthetically undesirable.

Other patents disclosing molding a plastic razor head around a blade are U.S. Pat. No. 3,070,883 (Grathwohl); U.S. Pat. No. 2,789,346 (Algier et al.); and U.S. Pat. No. 3,703,765 (Perez).

SUMMARY OF THE INVENTION

According to this invention, a disposable razor or razor cartridge is formed by molding, as a single unit, a blade covering means and blade support means, by supporting the blade by a trident-shaped supporting member butting the blade with the tips of the support member to coincide with an opening formed during molding on either side of the blade support means and a centrally positioned sleeve having an opening adjacent to the blade.

BRIEF DESCRIPTION OF THE DRAWINGS

The invention may be more readily understood by reference to the drawing in which.

DETAILED INVENTION OF THE INVENTION AND DRAWINGS

Figure 1:
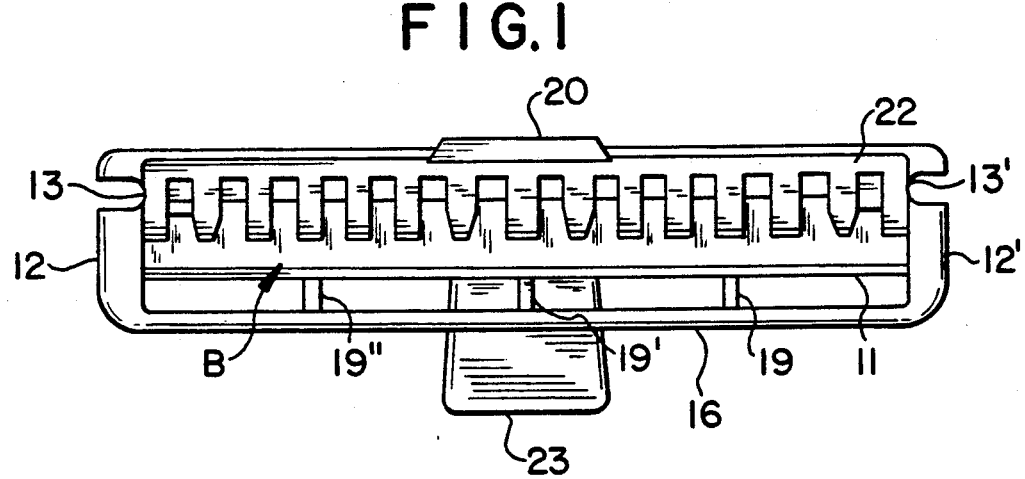
FIG. 1 is a top plan view of one embodiment of the razor of this invention.

The invention involves the concept of utilizing a blade preferably held in place by notches and supported by a forked support member to form a portion of the male member used in the molding of a unitary blade support and cap structure. As can be seen by reference to FIG. 4 a razor blade B having notches and 13' blade shaving edge 11 and slots 14 are used to make the disposable razor of this invention. The blade is positioned within the mold by having mold inserts engage notches 13 and 13' and form part of the side male member of the mold cavity. These side supports result in indentations in the cap and blade support corresponding to blade insert 13 at the side of the molded razor (see FIGS. 1-3). This aligns the blade in a proper orientation for the subsequent molding process to follow. The blade is supported by support member T which may be trident-shaped (see FIG. 5) having upward support surfaces 21. The number of separate support surfaces corresponds to the number of distinct open areas in the blade seat 12. When the trident support configuration is used, sleeve 20 is open at the end while if only a 2-pronged support is used to support the blade, the sleeve is closed with plastic at the support surface end abutting the blade.

Figure 4:
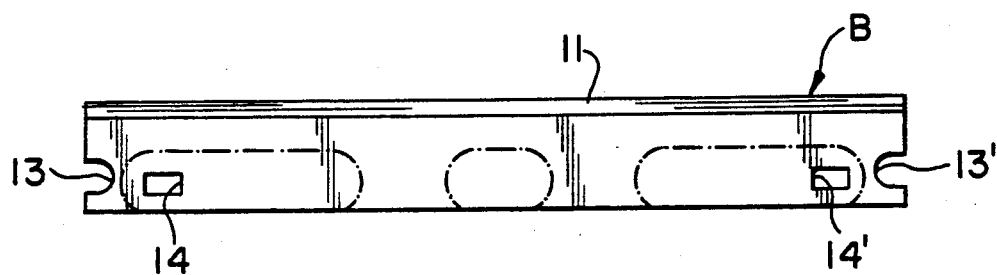
FIG. 4 is a bottom plan view of the blade suitable for use with this invention.
Figure 5:
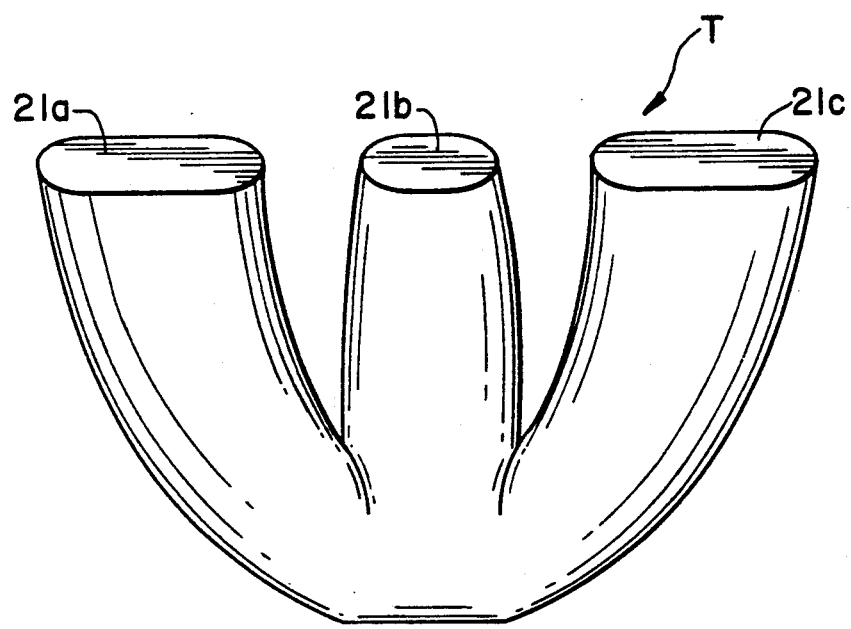
FIG. 5 is a perspective view of a support structure used in this invention.

As can be seen by reference to FIG. 4, the support surfaces 21b and c engage the blade generally in the areas shown by the phantom lines at the rear portion of the blade opposite the cutting edge 11. Thus supported, the blade and trident combination form a male member around which the unitary cap or cover and blade support surface is formed.

Figure 2:
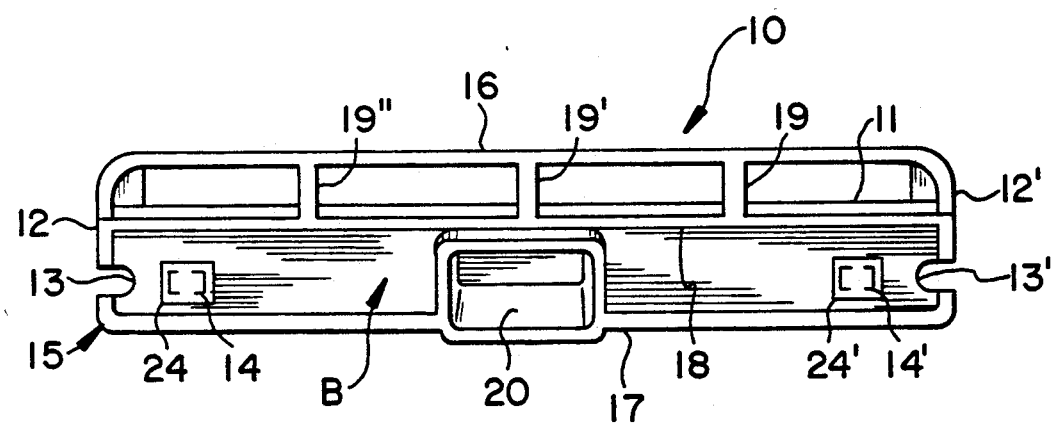
FIG. 2 is a bottom plan view of the embodiment of this invention shown in FIG. 1.
Figure 3:
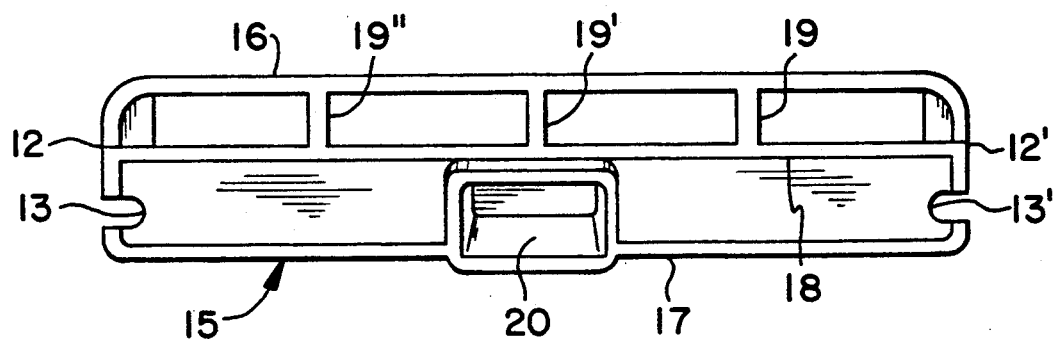
FIG. 3 is a bottom plan view of the seat of the razor of FIG. 1 without the blade.

The actual plastic molded shape can best be understood by reference to FIGS. 1, 2, and 3. As can be seen by reference to FIG. 3 and 5 the various trident arms 21a, b and c correspond to the openings formed in the rearward portion of the blade support surface.

Generally rectangular support surface 15 includes a back, longitudinally-extending support bar 17, an essentially-centrally-positioned support bar 18 and downwardly projecting sleeve 20 which form the rearward portion of the blade seat. The openings formed by the inner surfaces of sides 12 and 12', longitudinal support bar 17 and center support 18 correspond generally to the trident top surfaces 21a and c while trident surface 21b corresponds to the opening in sleeve 20 adjacent the blade B, in the preferred configuration.

The guard bar 16 is formed along the leading portion of the blade support surface and extends essentially parallel to the rear support bar 17 and central bar 18. Ribs 19 extend from the center bar 18 to the guard bar 16. As can be seen more readily from reference to FIG. 2, the blade B only extends a short distance over the center support bar 18 with the guard bar ribs forming more of an extension then an actual support for the blade itself.

The cap 22 is molded as a single unitary piece attached to the blade support portion 15 by plastic which extends around the rear portion of the bade and outward to form the cap and also through blade slots 14, 14' to form upward extending thermoplastic tabs 24 which join the cover to the blade support portion due to corresponding recesses in the support member T. The tabs 24 and 24' are slightly larger than holes 14, 14' and therefore provide an anchoring site for the cap to the blade as well as the center rib 18. Sleeve 20 as can best be seen by reference to FIG. 1, provides a site for handle 23 attachment.

It has been found that in order to successfully mold a unitary cap and cover utilizing the blade as a portion of the mandrel, that is was necessary to support the blade not only in the center, but also at either side to prevent blade distortion resulting from the forces generated by inflowing thermoplastic material during the molding process. Our co-pending patent application filed Apr. 24, 1987 describes the concept of forming a center mandrel of thermoplastic material and utilizing the combination of the blade and the center mandrel as template-male mold member for subsequent molding of a compatible cap an blade support. Attempts to eliminate what is in essence a two step molding process had been unsuccessful, because it was found that positioning of the blade at either end allowed the blade to blow in the center. The preferred support configuration and resulting configuration of the blade support for the razor resulted from realization that the blade would have to be supported along its entire length during the formation of a unitary cover and support for the razor.

Figure 6:
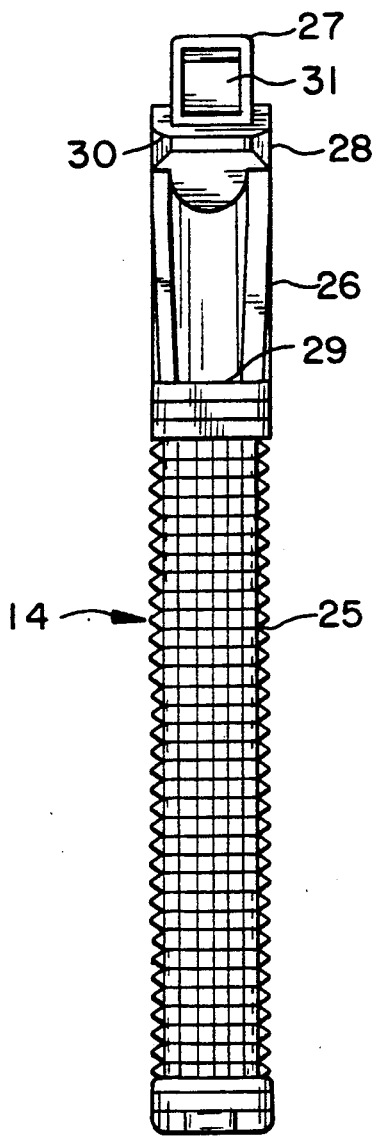
FIG. 6 is a front elevational view.
Figure 7:
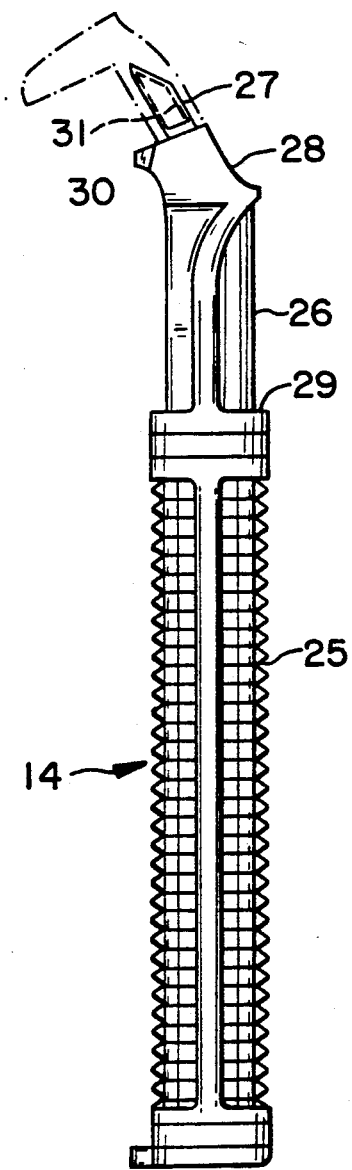
FIG. 7 is a side perspective view of a handle which may be used with the cartridge of this invention.

In a preferred variation of this invention, the handle shown at FIGS. 6 and 7 is preinserted into the mold prior to the formation of the blade and seat combination and, as part of the male portion of the mold, the seat and cap are formed around it eliminating a subsequent molding step. The preinserted handle according to this invention can be made of plastic or other materials and if made of plastic can be inserted in the mold cavity used for the razor head or formed in the same mold used for the head.

The handle includes gripping area 25, having flange 26 extending upwardly axially from shoulder 29. The flange 26 which is thinner than gripping area 25 includes projection 28 extending upward at an obtuse angle from its top portion. Tongue 27 extends axially from projection 28 depending from shoulder 30. Tongue 27 contains opening 31 which forms an anchor site for the shank part 20 of the blade support 15. Thus, when molding is completed fluid thermoplastic forming the blade support 15 has flowed through and around opening 31 and tongue 27 and set to provide a completed disposable razor. When this method is used, the trident center is modified to accept the handle.

Figure 8:
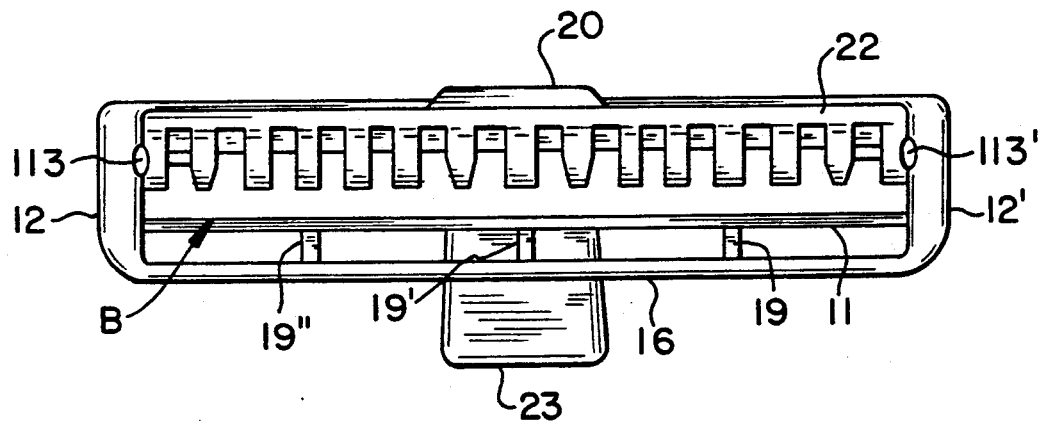
FIG. 8 is a top plan view of a second embodiment of the razor of this invention.
Figure 9:
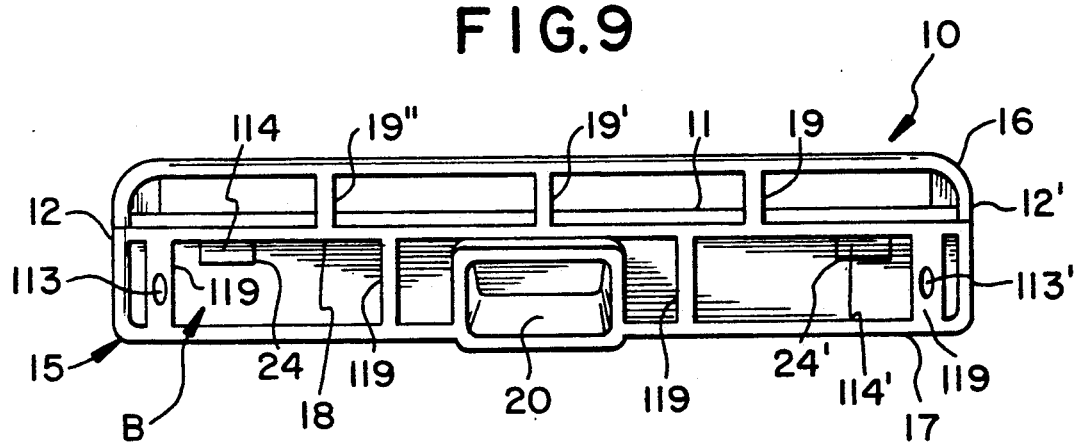
FIG. 9 is a bottom plan view of the seat of the razor shown in FIG. 8.
Figure 10:
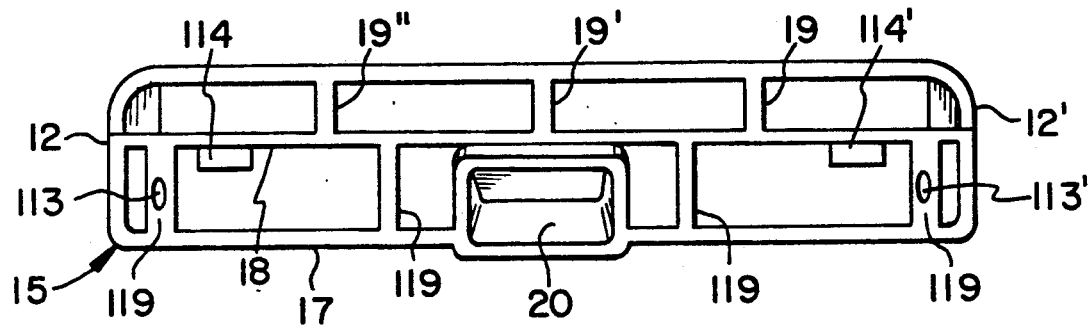
FIG. 10 is a bottom plan view of the seat of the razor of FIG. 8.

The embodiment shown at FIGS. 8, 9 and 10 differ from the first embodiment by utilizing inwardly positioned male mold members to prevent the blade from shifting horizontally. These members extend through blade holes slightly inward of the blade sides providing parallel, side surfaces for the razor and a pair of small openings 113 and 113' positioned toward the back, outer ends of the razor away from the blade. Also tabs 114 and 114' abut support bar 18 for added rigidity, and added struts 119 further add rigidity to the support structure 15.

While the fingered cap depicted at FIG. 1 is preferable, any particular configuration for a blade cover may be used and alternative blade cover designs readily suggest themselves to those with reasonable skill in the art. The inventive concept of this invention resides in the design of a suitable support structure for the blade which allows the subsequent plastic molding without distortion of the blade and the formation of mating blade support structure for the razor having a downwardly extending collar and openings along either side. The combination provides maximum support with minimum use of thermoplastic material and ease of mold removal from the male member form by the combination of the blade and mold blade support.

We claim:

1. Method of molding a disposable razor or cartridge with a rectangular blade having a cutting edge disposed along one side thereof and at least one notch on the sides adjacent said cutting edge, a unitary blade covering means and blade support means formed of thermoplastic material, said support means comprising at least one opening at each end at the opposite side of said blade cutting edge and positioned on either side of a downwardly extending sleeve, said method comprising:

a) Supporting and locating said blade within a mold having side male members by butting said blade by a fixed forked member having top configurations corresponding to each of said support means openings and engaging said notches with said side male members, b) forming said unitary blade support means and covering means by introducing thermoplastic material into said mold; and c) mating said unitary means with a handle.

2. The method of claim 1 wherein said blade is supported by a trident shaped support means.

3. Method of claim 1 wherein said covering means is molded in the form of a fingered cap.

4. Method of claims 1, 2 or 3 wherein a handle is used as part of the male mold member.

* * * * *